(12) United States Patent
Hidesawa

(10) Patent No.: US 7,340,524 B2
(45) Date of Patent: Mar. 4, 2008

(54) TWO STAGE SERVICE PROVIDING METHOD AND SYSTEM

(75) Inventor: Shigeru Hidesawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 10/057,886

(22) Filed: Jan. 29, 2002

(65) Prior Publication Data

US 2003/0069928 A1    Apr. 10, 2003

(30) Foreign Application Priority Data

Oct. 10, 2001    (JP) ............................. 2001-313007

(51) Int. Cl.
*G06F 15/16*    (2006.01)
(52) U.S. Cl. ...................... 709/229; 709/205
(58) Field of Classification Search ................. 709/229
See application file for complete search history.

(56) References Cited

U.S. PATENT DOCUMENTS

| | | | |
|---|---|---|---|
| 6,449,601 B1 * | 9/2002 | Friedland et al. ............. | 705/37 |
| 6,450,500 B1 | 9/2002 | Miller ......................... | 273/292 |
| 6,615,240 B1 * | 9/2003 | Sullivan et al. ............. | 709/205 |

FOREIGN PATENT DOCUMENTS

| JP | 6-26970 | | 4/1994 |
|---|---|---|---|
| JP | 10-315661 | | 12/1998 |
| JP | 2001-125952 | * | 5/2001 |
| JP | 2001-222497 | | 8/2001 |

OTHER PUBLICATIONS

Office Action dated Oct. 2, 2006 in corresponding Japanese Patent Application No. 2001-313007.
Extact from Nikkei Sangyo Shimbun, the issue of Oct. 3, 1989, "Word Processing Software Sales Promotion Starts".

* cited by examiner

*Primary Examiner*—Yves Dalencourt
(74) *Attorney, Agent, or Firm*—Staas & Halsey LLP

(57) ABSTRACT

A service providing server machine and a service utilizing client machine which constitute a system for providing and utilizing two-stage services consisting of a tentative service (e.g., non-chargeable experience service) and a regular service (e.g., chargeable full-support service) over a communication line such as the internet so that a service system integrating the system may increase the users.

Displaying the point value changing corresponding to the available time on the regular service when the tentative service is utilized on the client machine.

34 Claims, 14 Drawing Sheets

USER INFORMATION

| TELEPHONE NO. |
| NAME |
| ZIP CODE |
| ADDRESS |
| AGE |
| SEX |
| ID = 0 |
| SP = 0 |

Fig. 9

| |
|---|
| TELEPHONE NO. + NAME |
| P (POINT VALUE) |
| T (TIME) |
| TELEPHONE NO. + NAME |
| P |
| T |
| TELEPHONE NO. + NAME |
| P |
| T |
| TELEPHONE NO. + NAME |
| P |
| T |

USER INFORMATION

| TELEPHONE NO. |
|---|
| NAME |
| ZIP CODE |
| ADDRESS |
| AGE |
| SEX |
| ID = XXXXXXX |
| SP = (SERVICE POINT VALUE) |

Fig. 11

TWO STAGE SERVICE PROVIDING METHOD AND SYSTEM

BACKGROUND OF THE INVENTION

1. Field of the Invention

The present invention relates to a service providing server machine and a service utilizing client machine constituting a system for providing and utilizing services through a communication line such as the internet, especially a system for providing and utilizing services in two stages of a first stage of providing a tentative service (e.g., non-chargeable experience service) and a second stage of providing a regular service (e.g., chargeable full-support service), a service providing method for using a server machine to provide services in two stages, and a server program storage medium and a client program storage medium for recording a server program or a client program which causes a computer to operate as such a server machine or a client machine respectively.

2. Description of the Related Art

With the recent developments of communication lines including the internet, a variety of services have been provided and utilized including, for example, a home page referencing system, a mail order system, an education system, and a game over the internet.

These various services may include a system for collecting utilization charges from a user to provide him with chargeable services, a shareware mail order system which needs to receive a charge or its substitute from a user (purchaser), etc.

Such service systems may include many systems for providing services in two stages anyway, such as a system for first providing a new user with non-chargeable services for a predetermined period or time to later provide him with regular services after he subscribed formally or a system for first permitting a user to utilize shareware free of charge or very inexpensively to later permit him to purchase it if he likes it.

Such systems for providing services over a communication line have a large theme of how to increase the system users. To do so, many systems often provide tentative services such as the above-mentioned non-chargeable experience service or period-limited non-chargeable utilization services and sometimes provide the users with some merits such as point values or discount services in a mail order system. Although these services contribute to an increase in the subscribers, any other measures are expected to be carried out for further increasing the subscribers.

SUMMARY OF THE INVENTION

In view of the above, it is an object of the invention to provide a server machine and a client machine constituting a service system integrating a system for increasing the users, a method for using a server machine to provide services, and a server program storage medium and a client program storage medium for recording a server program and a client program which causes a computer to operate as the server machine or the client machine respectively.

A client machine to achieve the above-mentioned object is interconnected with a service providing server machine with a communication line to thereby subscribe for a service system by the server machine in order to receive various services from the server machine according to the service system, the server machine providing a regular service and, prior to that, providing a tentative service, the client machine comprising:

a tentative service utilization section for utilizing a tentative service provided by the server machine;

a point value display section for displaying a time-wise changing point value that can be utilized in a regular service when the tentative service utilization section is utilizing a tentative service; and a regular service utilization procedure section for following a procedure necessary for utilizing a regular service provided by the server machine.

The client machine of the invention is adapted to display a point value sequentially changing as a time available in a regular service passes by when utilizing a tentative service, so that such a sequential change in the point value can call a client machine user's attention to thereby prompt him to receive regular services.

Preferably the point value display section of this client machine of the invention will display a point value sequentially increasing as the time passes by when the tentative service utilization section is utilizing a tentative service.

Many service systems utilizing a communication line require complicated operations for utilization and may sometimes require a user to first get accustomed to utilizing a tentative service to some extent and then follow a procedure necessary for receiving a regular service. In such a case, by more increasing a point value that can be utilized in a regular service as a user utilizes more tentative services, the user can be prompted to be restricted to utilization of tentative services for the time being and, as the point value is increased, prompted to receive a regular service.

In the above-mentioned client machine of the invention, preferably the point value display section displays a point value sequentially decreasing as the time passes by when the tentative service utilization section is utilizing a tentative service.

In the case of such a service system that has few problems even if transition is made from a tentative service to a regular service at an early timing, if the point value is decreased as tentative services are utilized more, the user is prompted to shift to regular services earlier so that he may receive more merits.

Also, the above-mentioned client machine of the invention may be provided with such a point value updating section that sequentially changes a point value displayed at the point value display section when the tentative service utilization section is utilizing a tentative service or the point value display section may receive and display sequentially updated point values transmitted from the server machine.

That is, the point values may be updated on his own (client machine) side or on the side of the server machine.

Note here that by the invention, a point value itself may be something that is worth of purchasing or replacing an article or simply be an index for determining the contents of a service.

Further, the client machine of the invention may be provided with a regular-service utilization section for continuing the utilization of a regular service provided by the server machine after the regular-service utilization procedure section is used to take necessary procedure steps.

In the case of a software sales service, for example, such a system that permits a user to first use the software on a trial manner as a tentative service for a limited period and later sells it to him as a regular service if he likes it, this sale finishes the software sales service to thereby make it unnecessary to continue the regular service later on; in the case of a distribution service over the internet for example, however, the user is permitted to utilize the provider as a tentative service at no charge to him for a limited period (or time) and, if he likes it, pays a regular service to continue the utilization thereof.

Also, a server machine to achieve the above-mentioned object of the invention is interconnected over a communication line with a client machine which subscribes for a service system provided thereby to receive a service provided therefrom, thus providing a regular service thereof and, prior to that, provides also a tentative service thereof, comprising:

a tentative service providing section for providing a tentative service to the client machine prior to providing a regular service;

a regular-service utilization procedure accepting section for accepting a procedure necessary for utilizing a regular service that is made by the client machine receiving a tentative service from the tentative service providing section; and a regular service providing section for providing a regular service to the client machine that has received a regular service utilization procedure, wherein the regular service providing section gives a service corresponding to a point value which corresponds to tentative services provided by the tentative service providing section for a time lapse from a moment when a client machine makes a procedure up to a moment when the regular-service utilization procedure accepting section accepts the procedure of the client machine.

The server machine of the invention provides a user who has took procedure steps necessary for utilizing a regular service with such services that correspond to a point value corresponding to tentative services provided to the user up to the current moment, thus promoting the user to shift from a tentative service to a regular service. In this case, the method for utilizing the point value in a regular service is not in particular limited; for example, a software sales service system may reflect the point value on a sales price or an internet distribution service system may reflect them on a subscription charge or use them as an initial value of the point value added in correspondence to the utilization of regular services after subscription.

In the server machine of the invention, the regular service providing section might well provide regular services continuously to a client machine whose procedure is accepted by the regular-service utilization procedure accepting section, in which case preferably the regular service providing section provides regular services continuously to the client machine whose procedure is accepted by the regular-service utilization procedure accepting section and also gives a point value for providing additive services that correspond to an utilization situation of regular services and further provides such a service that gives as an initial value the point value that corresponds to tentative services provided by the tentative service providing section for a time lapse from a moment when the client machine made a procedure up to a moment when it was accepted by the regular-service utilization procedure accepting section.

This aspect is especially effective with an internet distribution service.

Also, by the server machine of the invention, a client machine connected therewith over a communication line sequentially updates a point value as time passes by when it is utilizing tentative services provided by the tentative service providing section, so that the regular-service utilization procedure accepting section may accept a procedure necessary for utilizing regular services made by a client machine receiving tentative services provided from the tentative service providing section and also accept a point value updated by the client machine at a moment when the procedure is accepted, while the regular service providing section may provides the client machine whose procedure was accepted by the regular-service utilization procedure accepting section with the services that correspond to a point value accepted by the regular-service utilization procedure accepting section; or such a point value updating section may be included that sequentially updates the point value that corresponds to the client machine as time passes by when the tentative service providing section is providing tentative services to the client machine, while the regular service providing section may provide services that correspond to a point value corresponding to the client machine that are updated by the point value updating section at a moment when a procedure made by the client machine is accepted by the regular-service utilization procedure accepting section.

That is, the point value may be updated by the server machine or the client machine.

In such an aspect that the server machine comprises a point value updating section, this point value updating section may be such that sequentially increase the point value for a client machine as time passes by when the client machine is receiving tentative services provided from the tentative service providing section or such that sequentially decreases the point value for a client machine as time passes by when the client machine is receiving tentative services provided from the tentative service providing section.

Also, a servicing method of the invention permits a server machine to provide services to a user machine, the services consisting of regular services provided to the user machine utilized by a subscribed user and tentative services provided to a user machine utilized by a non-subscribed user prior to provision of the regular services, the method comprising the steps of:

providing a tentative service to the user machine prior to providing a regular service;

storing a time when the user machine utilized the tentative service;

accepting such a procedure necessary for utilizing a regular service that is made by the user machine receiving the tentative service;

calculating a point value that corresponds to a time lapse for which the user machine utilized the tentative service up to a moment when the regular service utilization procedure is accepted; and providing a regular service to the user machine whose regular service utilization procedure was accepted and also providing a service that corresponds to the calculated point value to the user that took the procedure steps for utilization of the regular service.

The service providing method according to the invention promotes utilization of a regular service provided by the server machine.

Also, a service system of the invention comprises a client machine of the invention and a server machine of the invention in such a configuration that the server machine is connected through a communication line with the client machine to be provided with a service to thereby provide the client machine with services when it subscribed for the service system, in which:

the server machine provides a regular service and also a tentative service prior to provision of the regular service, including:

a tentative service providing section for providing the client machine with a tentative service prior to provision of the regular service;

a regular service utilization procedure accepting section for accepting a procedure necessary for utilizing a regular service that is made by the client machine provided with a tentative service by the tentative service providing section; and a regular service providing section for providing a regular service to the client machine whose procedure for the regular service utilization is accepted, specifically providing services that corresponds to a point value corresponding to tentative services provided by the tentative service providing section for a time lapse from a moment when the client machine made a procedure to the regular service utilization procedure accepting section up to a moment when the regular-service utilization procedure accepting section accepted the procedure; and the client machine includes:

a tentative service utilizing section for utilizing a tentative service provided by the server machine;

a point value display section for displaying a point value changing sequentially as a time available in the regular service passes by when the tentative service utilizing section is utilizing the tentative service; and a regular service utilization procedure section for taking procedure steps necessary for utilizing a regular service provided by the server machine.

Also, a client program storage medium of the invention to achieve the above object records a client program that, when executed in a computer connected through a communication line with a server machine for providing a service, causes the computer to subscribe for a service system provided by the server machine to then operate as a client machine for receiving services according to the service system, the server machine providing a regular service and also a tentative service prior to the provision of the regular service, the client program storage medium recording the client program that causes the computer to operate as a client machine which includes:

a tentative service utilizing section for utilizing a tentative service provided by the server machine;

a point value display section for displaying a point value changing sequentially as a time available in a regular service passes by when the tentative service utilizing section is utilizing a tentative service; and a regular service utilization procedure section for taking procedure steps necessary for utilizing a regular service provided by the server machine.

This client program recorded in the client program storage medium of the invention includes any aspect of a program for realizing any one of the various aspects of the client machine of the invention.

A server program storage medium of the invention to achieve the above-mentioned object records a server program that, when executed in a computer connected through a communication line with a client machine to be provided with services, causes the computer to operate as a server machine which provides services to the client machine subscribed for a service system provided by the computer, in which the server program is adapted to provide a regular and also a tentative service prior to the provision of the regular service, specifically causes the computer to operate as a server machine including:

a tentative service providing section for providing a tentative service to the client machine prior to the provision of a regular service;

a regular service utilization procedure accepting section for accepting a procedure necessary for utilizing a regular service that is made by the client machine provided with a tentative service by the tentative service providing section; and a regular service providing section for providing a regular service to the client machine whose regular service utilization procedure is accepted, wherein the regular service providing section provides services that correspond to a point value corresponding to tentative services provided by the tentative service providing section for a time lapse from a moment when the client machine made the procedure to the regular service utilization procedure accepting section up to a moment when it accepted that procedure.

This server program recorded in the server program storage medium of the invention includes any aspect of a program for realizing any one of various aspects of the server machine of the invention.

BRIEF DESCRIPTION OF THE DRAWINGS

FIG. 9 is an illustration for showing user information of one person in a user database which records the information of users who subscribed for an internet distribution service system constituted in the server machine.

FIG. 10 is an illustration for showing such a list of P (point) and T (remaining time) of each user who utilizes a non-chargeable experience service that is recorded in the user DB at a server.

FIG. 11 is an illustration for showing such user information of regular members that is recorded in the user DB at the server.

DETAILED DESCRIPTION OF THE PREFERRED EMBODIMENTS

The following will describe embodiments of the invention.

First, the following will describe a hardware configuration of a computer operating as one embodiment of a server machine of the invention and a computer operating as one embodiment of a client machine of the invention.

Figure 1:
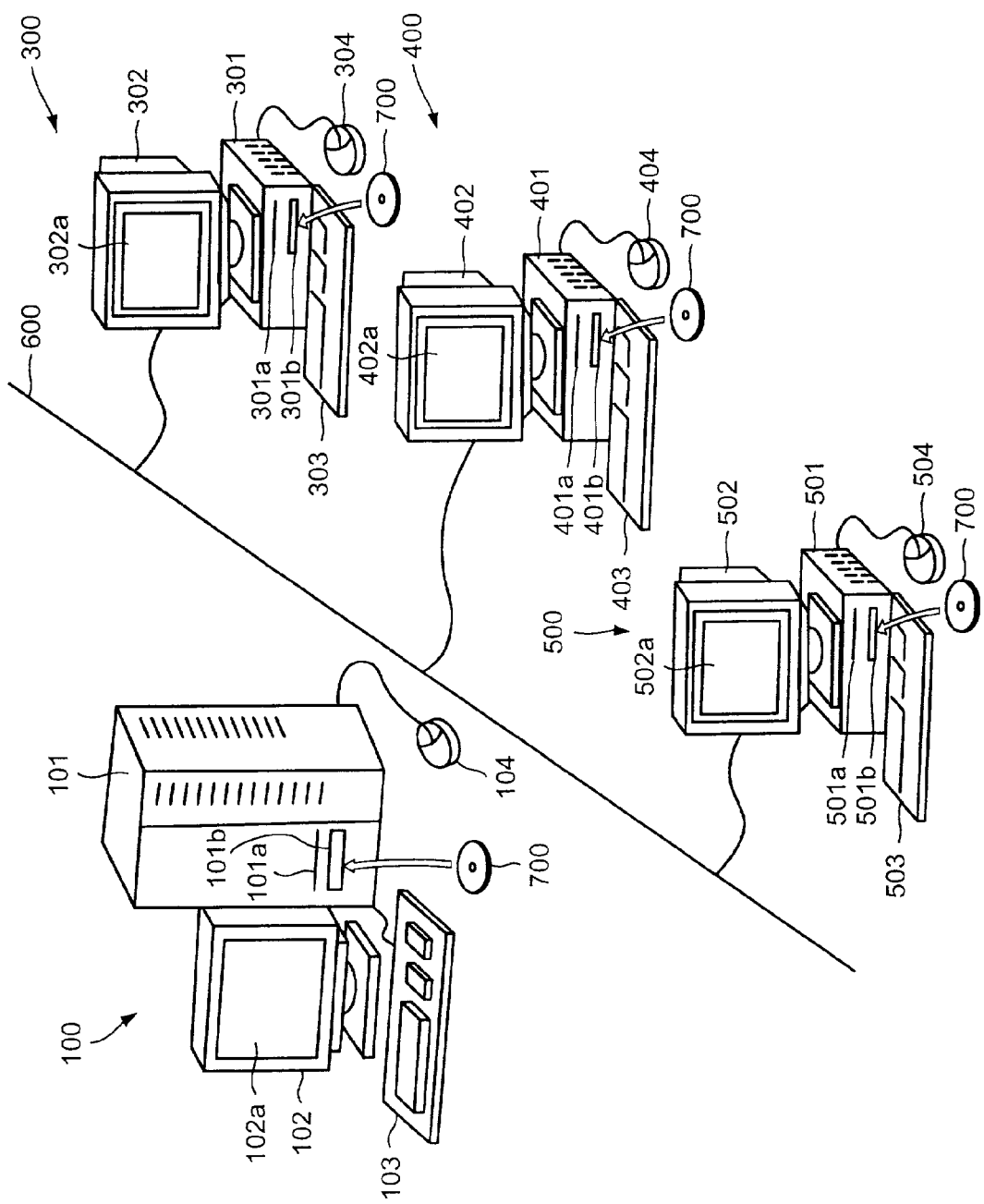
FIG. 1 is an illustration for showing part of a computer system for operating a server machine and a client machine.

FIG. 1 is an illustration for showing part of a computer system for operating the server machine and the client machine.

FIG. 1 exemplifies one computer 100 operating as the server machine and three computers 300, 400, and 500 operating as client machines connected to the computer 100 through a communication line 600. The communication line 600 may be any one such as the internet, a LAN (Local Area Network), a WAN (Wide Area Network), etc.

A server program is installed to the one computer 100 and a client program is installed to all of the three computers 300, 400, and 500 so that they may operate as the server machine and the client machine respectively.

Those computers 100, 300, 400, and 500 may be such a computer as a so-called workstation or a personal computer.

Those computers 100, 300, 400, and 500 comprise, respectively, body portions 101, 301, 401, and 501 each of which incorporates therein a CPU (Central Processing Unit), a RAM (Random Access Memory), a hard disk, and a communication board, etc., display portions 102, 302, 402, and 502 which display images and character strings on display screen 102a, 302a, 402a, and 502a according to instructions sent from the body portions 101, 301, 401, and 501 respectively, keyboards 103, 303, 403, and 503 through which the user enters his instructions for the computers 100, 300, 400, and 500, and mice 104, 304, 404, 504 for entering instructions corresponding to an icon etc. displayed thereat when they are present at any given position on the display screens 102a, 302a, 402a, and 502a respectively.

The body portions 101, 301, 401, and 501 further respectively have, as viewed externally, flexible disk loading openings 101a, 301a, 401a, and 501a through which a flexible disk (not shown) is loaded, and CD-ROM loading openings 101b, 301b, 401b, and 501b through which a CD-ROM 700 is loaded and also incorporate therein a flexible disk drive and a CD-ROM drive for driving and accessing a flexible disk and a CD-ROM700 loaded through these loading openings 101a, 301a, 401a, 501a, 101b, 301b, 401b, and 501b.

Figure 2:
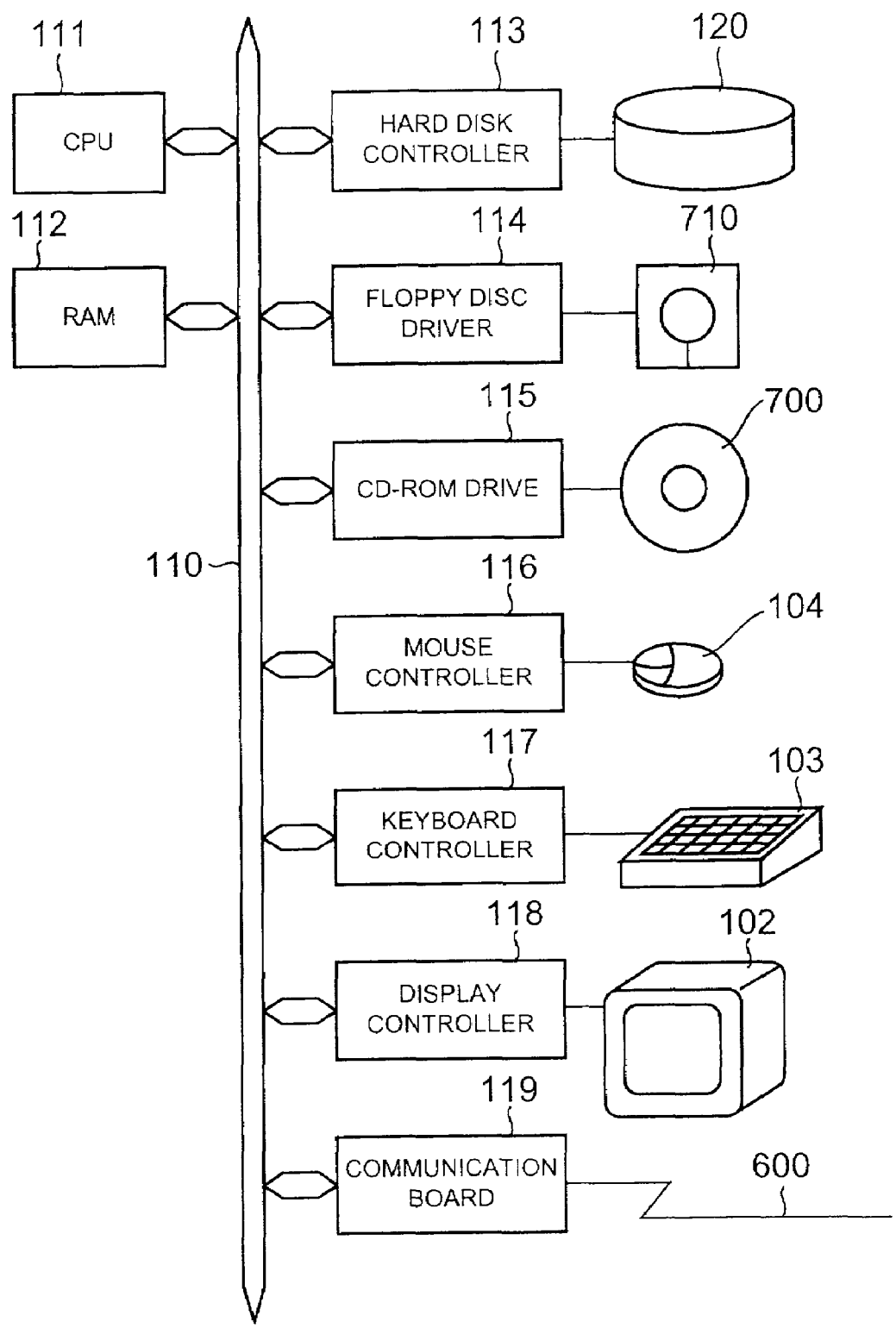
FIG. 2 is a diagram for showing a hardware configuration of the computer having the external view shown in FIG. 1.

FIG. 2 shows a hardware configuration of the computer having the external view shown in FIG. 1. Although the following will describe the computer 100 as a representative, the other computers 300, 400, and 500 have almost the same configuration.

In the hardware configuration shown in FIG. 2 are present a CPU111, a RAM112, a hard disk controller 113, a flexible disk drive 114, a CD-ROM drive 115, a mouse controller 116, a keyboard controller 117, a display controller 118, and a communication board 119, which are all connected mutually with a bus 110.

The flexible disk drive 114 and the CD-ROM drive 115 are, as described with reference to FIG. 1, are used to access the flexible disk 710 and the CD-ROM700 which are loaded through the flexible disk loading opening 101a and the CD-ROM loading opening 101b respectively. The communication board 119 is connected to the communication line 600.

In FIG. 2 are also shown a hard disk 120 accessed by the hard disk controller 113, the mouse 104 controlled by the mouse controller 116, the keyboard 103 controlled by the keyboard controller 117, and a CRT display 102 controlled by the display controller 118.

To the CD-ROM loading opening 101b, 301b, 401b, and 501b of the computers mentioned above is loaded the CD-ROM700, which is a server program storage medium or a client program storage medium recording therein the server program a client program medium or the client program of the invention respectively, which are described below, so that subsequently the server program is installed to the computer 100 and the client program is installed to the three computers 300, 400, and 500, thus constituting a server machine and a client machine for operation.

Alternatively, the client program may be downloaded through the communication line 600 to the computers 300, 400, and 500.

Further alternatively, these programs may be stored beforehand in a storage medium (e.g., hard disk) built in the computers 300, 400, and 500.

The following will describe the server program, the server program storage medium, the client program, and the client program storage medium according to one embodiment of the invention.

Figure 3:
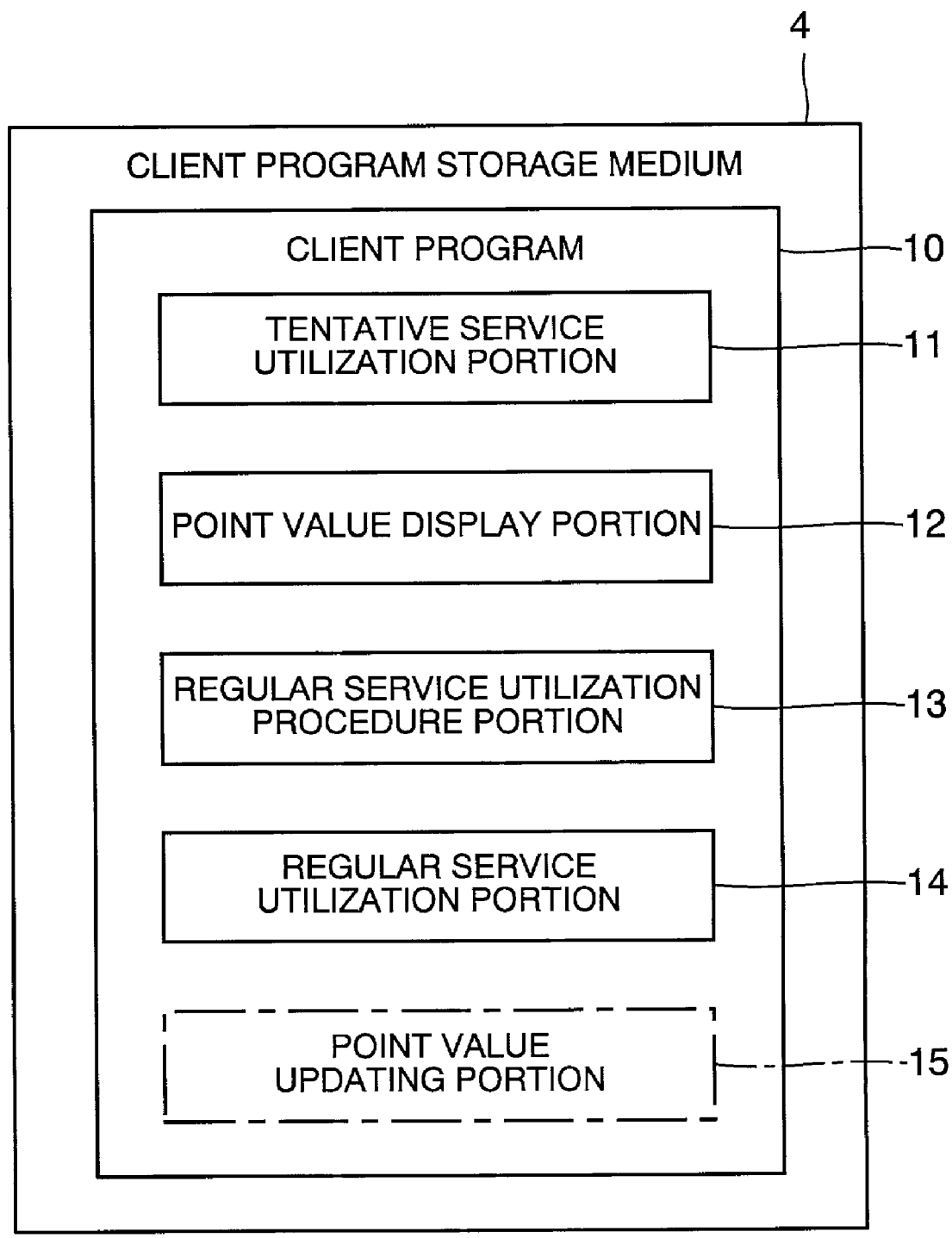
FIG. 3 is a diagram for showing an outlined configuration of a client program and a client program storage medium according to one embodiment of the invention.
Figure 4:
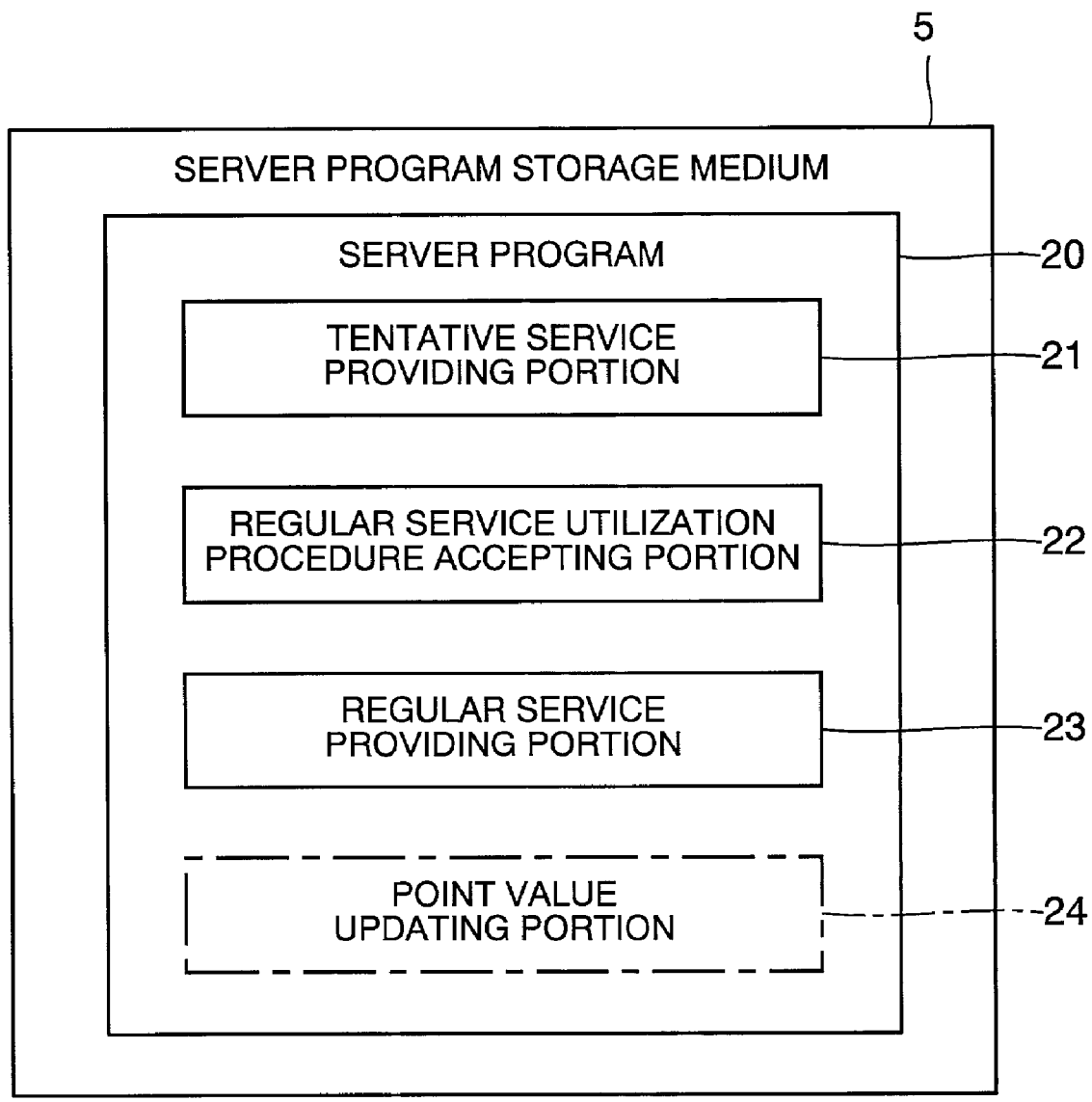
FIG. 4 is a diagram for showing an outlined configuration of a server program and a server program storage medium of the one embodiment of the invention.

FIG. 3 outlines a configuration of the client program and the client program storage medium according to the one embodiment of the invention and FIG. 4 outlines a configuration of the server program and the server program storage medium according to the one embodiment of the invention.

As shown in FIG. 3, this client program storage medium 4 records therein a client program 10 having a tentative service utilization section 11, a point value display section 12, a regular service utilization procedure section 13, and a regular service utilization section 14. This client program 10 may contain a point value updating section 15. In this case, a point value updating section 24 is unnecessary which is contained in a server program 20 shown in FIG. 4.

The client program storage medium 4 shown in FIG. 3 just represents in nomination a CD-ROM recording therein the client program 10 or a hard disk etc. recording therein the client program for a computer after this client program 10 is installed to this computer.

The client program 10 is executed by the computers 300, 400, and 500 (see FIG. 1) connected to the server machine through the communication line 600 to thereby permit each of these computers 300, 400, and 500 to operate as a client machine according to the one embodiment of the invention. The actions of these portions 11-15 of the client program 10 are described later.

A server program storage medium 5 shown in FIG. 4 records therein the server program which as a tentative service providing section 21, a regular service utilization procedure accepting section 22, and a regular service providing section 23. The server program 20 of FIG. 4 further contains the point updating section 24 if the point updating section 15 is not contained in the client program 10 shown in FIG. 3.

Like the client program storage medium 4 shown in FIG. 4, the server program storage medium 5 just represents in nomination a CD-ROM recording therein the server program 20 or a hard disk etc. recording therein the server program for a computer after this server program is installed to this computer.

This server program 20 is executed by the computer 100 connected through the communication line 600 with the computers 300, 400, and 500 (see FIG. 1) to thereby permit this computer to operate as a server machine according to the one embodiment of the invention. The actions of these portions 21-24 of this server program are described later.

Figure 5:
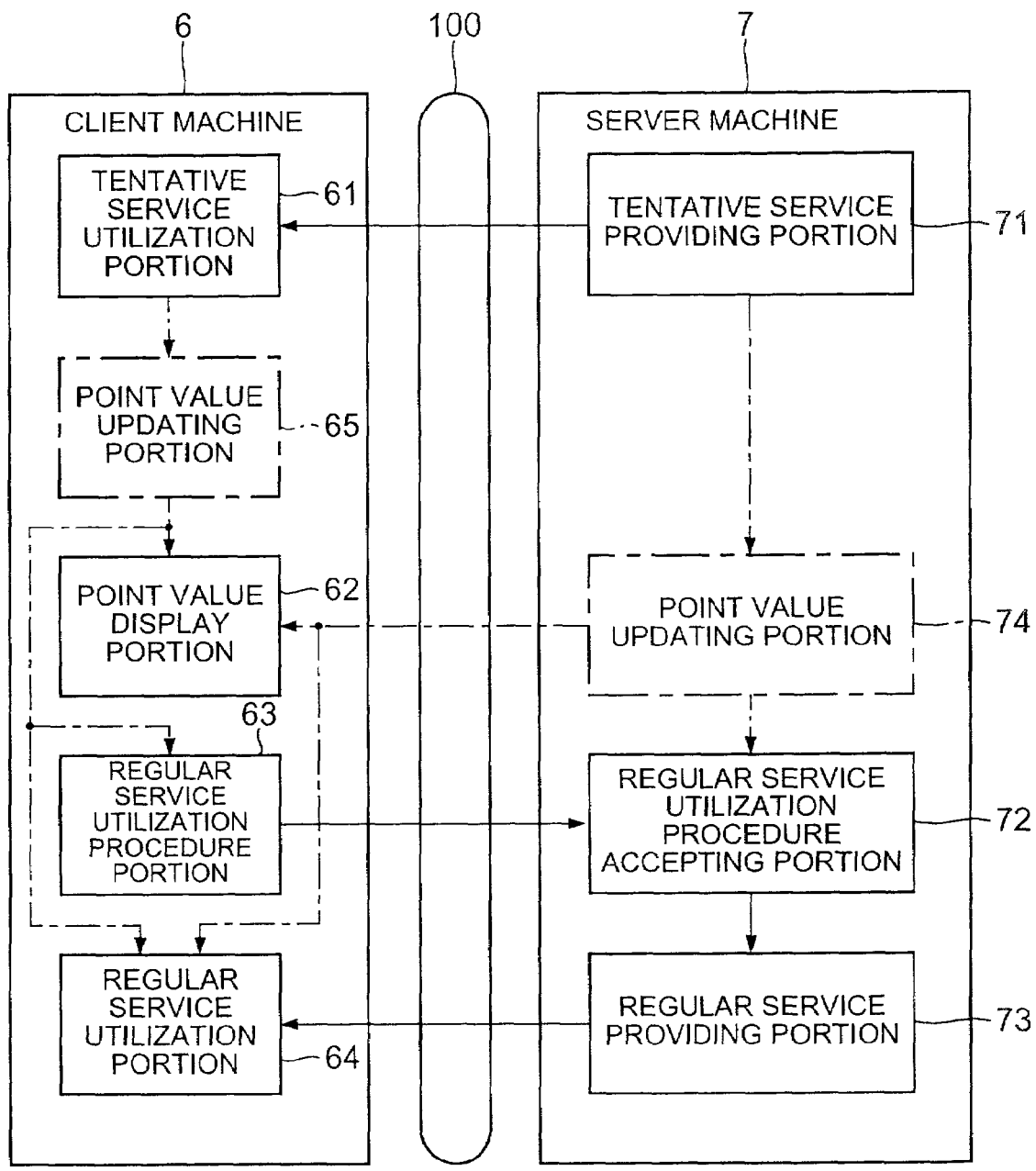
FIG. 5 are functional block diagrams showing a client machine and a server machine according to the one embodiment of the invention respectively.

FIG. 5 shows functional block diagrams of the client machine and the server machine according to the one embodiment of the invention respectively.

In FIG. 5 are illustrated a client machine 6 constituted in a computer of a user side utilizing services, a server machine 7 constituted in a computer of a service providing side, and a communication line 100 for interconnecting the client machine 6 and the server machine 7. In contrast to FIG. 1 showing the three computers 300, 400, and 500 operating as a client machine, for simplicity, FIG. 5 shows a client machine constituted in one of these three computers.

The client machine 6 shown in FIG. 5 comprises a tentative service utilization section 61, a point value display section 62, a regular service utilization procedure section 63, and a regular service utilization section 64. This client machine 6 may comprise also a point value updating section 65. If the server machine 7 does not comprise the point value updating section 74, the client machine 6 needs to comprise the point value updating section 65 and if the server machine 7 comprises the point value updating section 74, the client machine 6 does not need to comprise the point value updating section 65.

Also, the server machine 7 comprises a tentative service providing section 71, a regular service utilization procedure accepting section 72, and a regular service providing section 73. The server machine 7 further comprises a point value updating section 74 if the client machine 6 does not comprise the point value updating section 65 in the system.

The tentative service utilization section 61, the point value display section 62, the regular service utilization procedure section 63, the regular service utilization section 64, and the point value updating section 65 (if provided) of the client machine 6 shown in FIG. 5 corresponding to the tentative service utilization section 11, the point value display section 12, the regular service utilization procedure section 13, the regular service utilization section 14, and the point updating section 15 respectively of the client program 10 shown in FIG. 3 are adapted to combine the software and the computer hardware components of computers 300, 400, and 500 shown in FIG. 1 respectively, while the tentative service utilization section 11, the point value display section 12, the regular service utilization procedure section 13, the regular service utilization section 14, and the point value updating section 15 of the client program 10 shown in FIG. 3 are all composed of only an application program section of these software and hardware combinations. The client machine 6 of FIG. 5 is shown only in terms of the functions available when the client program 10 of FIG. 3 is installed to the computer, so that the following description of the actions of each of the portions of the client machine 6 of FIG. 5 should be understood to cover also the actions of the portions of the client program 10 of FIG. 3.

Likewise, the tentative service providing section 71, the regular service utilization procedure accepting section 72, the regular service providing section 73, and the point value updating section 74 (if provided) of the server machine 7 of FIG. 5 corresponding to the tentative service providing section 21, the regular utilization procedure accepting section 22, the regular service providing section 23, and the point value updating section 24 of the server program 20 shown in FIG. 4 respectively are adapted to combine the software and the hardware components, while the portions of the server program 20 of FIG. 4 are composed of only an application program section of these software and hardware combinations. The client machine 7 of FIG. 5 is shown only in terms of the functions available when the server program 20 of FIG. 4 is installed to the computer, so that the following description of the actions of each of the portions of the server machine 7 of FIG. 5 should be understood to cover also the actions of the portions of the server program 20 of FIG. 4.

The client machine 6 of FIG. 5 is connected through the communication line 100 with the service providing server machine 7 to thereby subscribe for a service system provided by this server machine 7 in order to be provided with services according to this service system. The server machine 7, on the other hand, is adapted to provide a regular service and also a tentative service prior to the provision of the regular service.

The tentative service utilization section 61 of the client machine 6 utilizes tentative services provided by the server machine 7.

Also, the point value display section 62 is adapted to display a point value changing as the time available in a regular service passes by when the tentative service utilization section 61 is utilizing a tentative service.

This point value display section 62 may be adapted to display a point value sequentially increasing as time passes by when the tentative service utilization section 61 is utilizing a tentative service or to display a point value sequentially decreasing as time passes by when the tentative service utilization section 61 is utilizing a tentative service If the client machine 6 is provided with the point value updating section 65, the point value display section 62 displays a point value which is updated by the point value updating section 65. The point value updating section 65 sequentially updates a point value displayed at the point value display section 62 when the tentative service utilization section 61 is utilizing a tentative service.

Alternatively, the client machine 6 is not provided with the point value updating section 65 and so the point value display section 62 may be adapted to receive display a sequentially updated point value transmitted from the server machine 7 when the tentative service utilization section 61 is utilizing a tentative service.

Also, the regular service utilization procedure section 63 of the client machine 6 is used to take procedure steps necessary for utilizing a regular service provided by the server machine 7.

Also, in this embodiment shown in FIG. 5, the client machine 6 is provided with a regular service utilization section 64, which is adapted to continuously utilize regular services provided by the server machine 7 after a necessary procedure was accepted by the regular service utilization procedure section 63.

In the case of a software sales service over a communication line, for example, purchase procedure steps necessary for utilizing a regular service (software sales) can be taken at the regular service utilization procedure section 63 to thereby complete software purchase in order to immediately terminate the service, thus rendering the regular service utilization section 64 unnecessary; however, if, for example, the software is upgraded inversion to then post it or if, for example, someone contracts the internet communication with a provider at the regular service utilization procedure section 63, once the necessary procedure steps are taken at the regular service utilization procedure section 63, all the services must be utilized on the part of the regular service utilization section 64.

Also, the server machine 7 of FIG. 5 is connected through the communication line 100 with the client machine which is provided with regular services when it has subscribed for a service system provided by this server machine 7.

This server machine 7 specifically provides, as mentioned above, a regular service and also a tentative service prior to the provision of the regular service.

The tentative service providing section 71 of this server machine 7 is adapted to provide a tentative service to the client machine 6 prior to the provision of a regular service.

Also, the regular service utilization procedure accepting section 72 is adapted to accept procedure steps necessary for utilizing a regular service that is made by a client machine provided with a tentative service by the tentative service providing section 71.

Further, the regular service providing section 73 provides a regular service to the client machine 6 whose procedure was accepted for utilization of regular services.

This regular service providing section 73 provides a service corresponding to a point value that corresponds to tentative services provided by the tentative service providing section 71 for a time lapse from a moment when the client machine 6 made a procedure to the regular service utilization procedure accepting section 72 up to a moment when it accepted it. Specifically, for example, the regular service providing section 73 provides regular services continuously to the client machine 6 whose procedure was accepted by the regular service utilization procedure accepting section 72 and also provides it with such point value necessary for provision of additive services that corresponds to a regular service utilization situation and, further provides it with such a point value as an initial value that corresponds to tentative services provided by the tentative service providing section 71 for a time lapse from a moment when the client machine 6 made a procedure to the regular service utilization procedure section 72 up to a moment when it accepted it. Alternatively, in the case of a software sales service, this regular service providing section 73 may give a discount service on the software sales price or give an option corresponding to the point value.

If, in this configuration, the client machine 6 is provided with the point value updating section 65, at this client machine 6, the point value is sequentially updated as a time available in a tentative service provided by the tentative service providing section 71 passed by, so that the regular service utilization procedure section 72 of the server machine 7 accepts such a procedure for utilization of a regular service that is made by the client machine 6 provided with a tentative service by the tentative service providing section 71 and also accepts a point value updated by the client machine 6 at the moment of the procedure acceptance, while the regular service providing section 73 provides the client machine 6 whose procedure was accepted by the regular service utilization procedure accepting section 72 with a service that corresponds to a point value accepted by this regular service utilization procedure accepting section 72.

If the client machine 6 is not provided with the point value updating section 65 and, instead, the server machine 7 s provided with the point value updating section 74, on the other hand, when the client machine 6 is being provided with a tentative service by the tentative service providing section 71, this point value updating section 74 updates a point value for this client machine 6 as time passed by, so that the regular service providing section 73 provides the client machine 6 whose procedure was accepted by the regular service utilization procedure accepting section 72 with a service that corresponds to such a point value for the client machine 6 that is updated by the point value updating section 74 at the moment of the procedure acceptance.

In this case, like the case where the client machine 6 is provided with the point value updating section 65, the point value updating section 74 may sequentially increase or decrease a point value for the client machine 6 as time passes by when the tentative service providing section 71 is providing the client machine 6 with a tentative service corresponding to the contents etc. of services provided by the server machine 7.

The following will describe the embodiments of the invention further specifically with reference to an example of an internet distribution service system.

In this example, the server machine provides a non-chargeable experience service (a kind of tentative service referred to in the invention) by which the user can get a non-chargeable internet distribution service for a predetermined time lapse (e.g., six hours) and an internet distribution service (a kind of a regular service referred to in the invention) by which the user can get the service at a charge to him.

Figure 6:
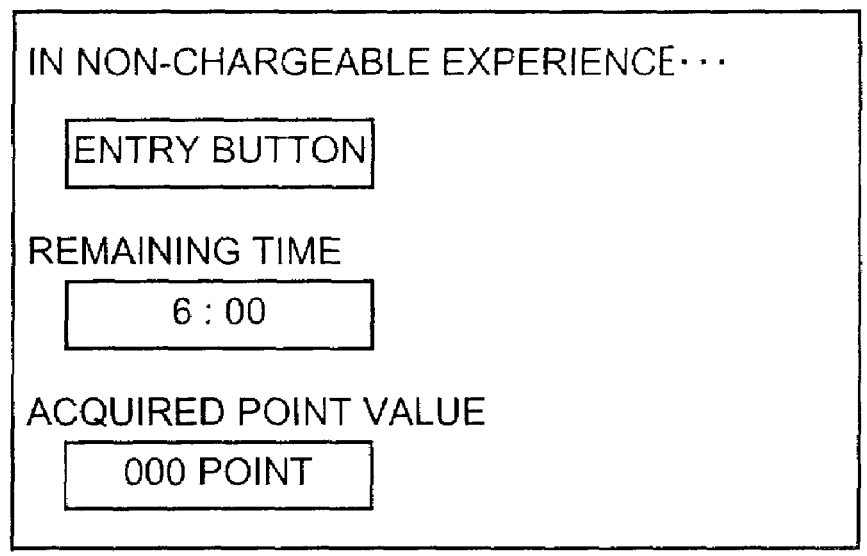
FIG. 6 is an illustration for showing a non-chargeable experience service display screen at a client machine during a non-chargeable experience service.
Figure 7:
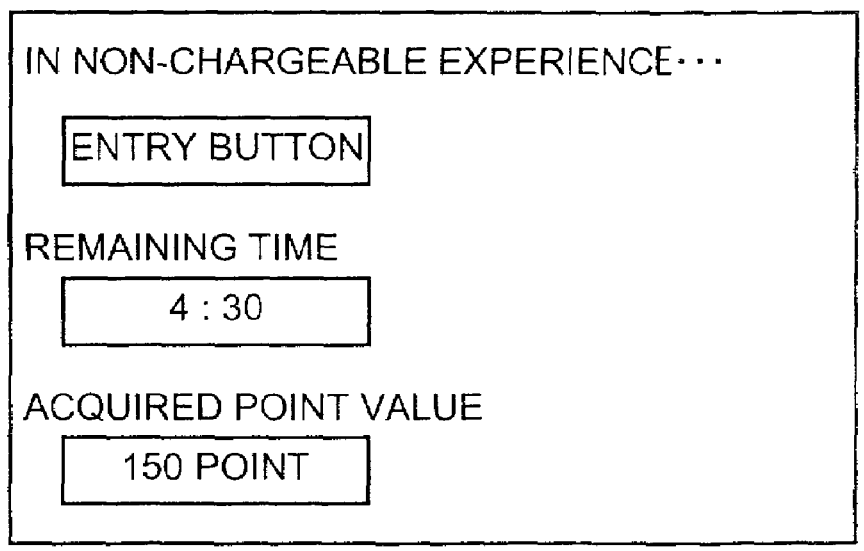
FIG. 7 is another illustration for showing a non-chargeable experience service display screen at the client machine during a non-chargeable experience service.

FIGS. 6 and 7 show non-chargeable experience service display screens displayed at a client machine when it receives a non-chargeable experience service. Of these FIGS. 6 and 7, FIG. 6 shows a screen which appears when the non-chargeable experience service starts and FIG. 7, a screen which appears when the non-chargeable experience service is utilized for one and a half hours.

On the screens of FIGS. 6 and 7 are shown the "ENTRY BUTTON" for taking procedure steps necessary for formally entering this internet distribution service system, the remaining time available for utilizing a non-chargeable experience service, and the acquired point value which increases with the increasing time lapse of utilizing non-chargeable experience services.

At the start of utilizing a non-chargeable experience service, as shown in FIG. 6, the remaining time is indicated to be 6 hours and the acquired point value is indicated to be 0; when one and a half hours elapses after the start of the non-chargeable experience service utilization, however, as shown in FIG. 7, the remaining time is indicated to be four and a half hours, decreased by one and a half hours, and the acquired point value is indicated to be 150. In this system, it is assumed that for each 10-minute of utilization of the non-chargeable experience service, the point value is incremented by 10.

When the mouse is clocked on the "ENTRY BUTTON" at any timing in utilization of a non-chargeable experience service, such an entry offer screen appears that permits one to subscribe for this internet distribution service system formally, so that when he writes in necessary items and transmits them to the server machine, he is authorized to formally enter this internet distribution service system. By this internet distribution service system, the point value is incremented according to how he utilizes internet distribution services after he entered it formally so that hey may get additive services (e.g., discounting of utilization charges or provision of mascot gifts) corresponding to thus accumulated point value; during a non-chargeable experience service, also, the acquired point value is incremented corresponding to a time lapse of utilizing the non-chargeable experience service, so that if the mouse is clicked on the "ENTRY BUTTON", a current point value acquired during the non-chargeable experience service is set as an initial point value for a regular service when this regular service is started. Thus, the user is motivated to enter a regular service system so that he may effectively utilize a point value he acquired when he utilized the non-chargeable experience service.

Aside from this server/client system, such a system is established that a user of a regular service thereof can send his questions in a telephone call or an e-mail about the service and then be answered but not during the utilization of the non-chargeable experience service. If a user with less knowledge enters the system without utilizing the non-chargeable experience service, he would ask many elementary questions that can be readily figured out even with a little experience in utilization, so that the other users with serious questions may lose chances of being answered for them. To guard against this, the system of the invention permits a user to utilize its non-chargeable experience service to some extent to thereby increment his point value sequentially and prompt him to enter; that is, this system avoids him from entering immediately but motivates him to enter only after he has got accustomed to utilization of its service to some extent.

Figure 8:
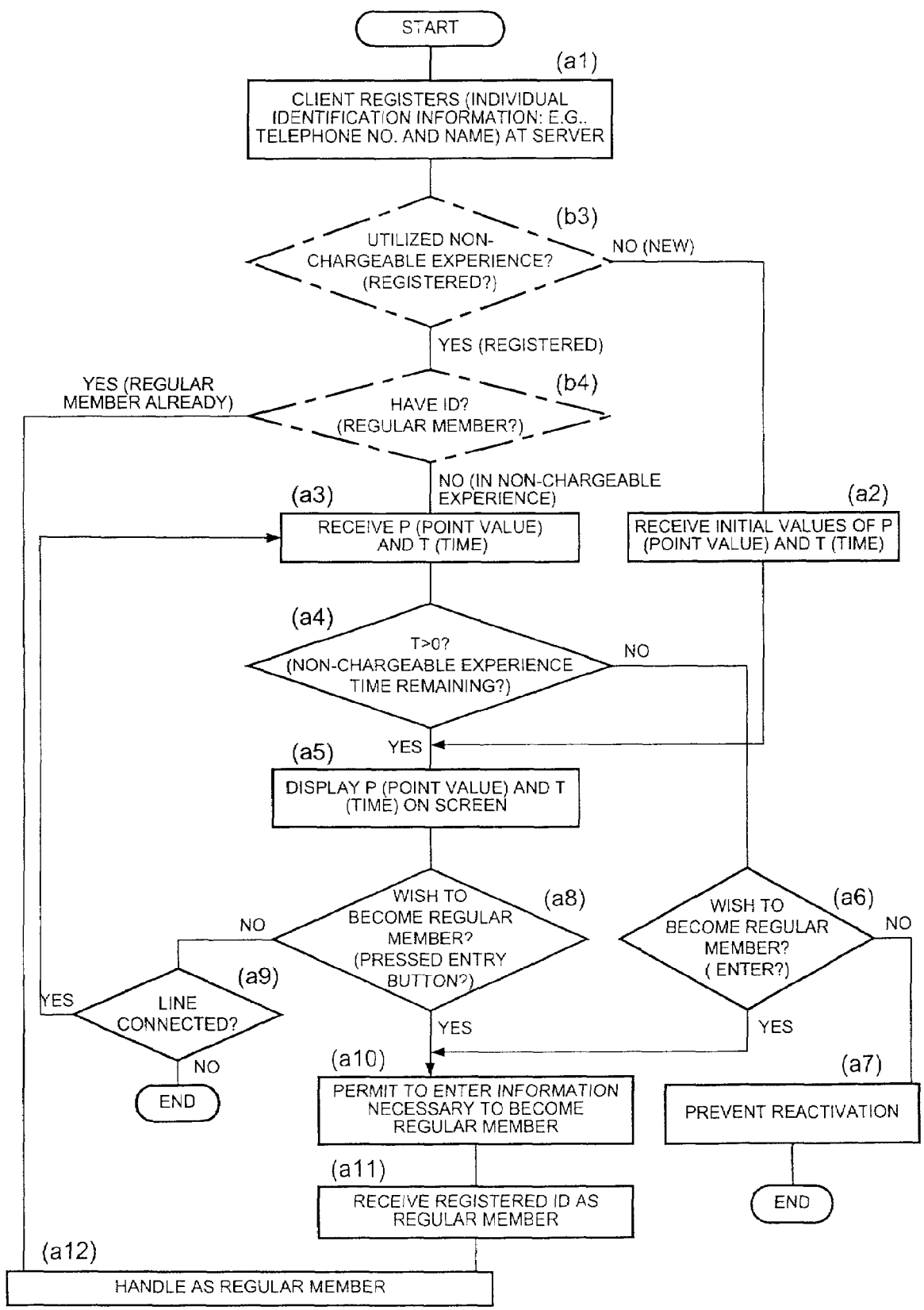
FIG. 8 is a flowchart for showing operations of the client program executed at the client machine.

FIG. 8 shows a flowchart of a client program executed at the client machine.

First, a client transmits his individual identification (e.g., telephone number, name, etc.) to a server to then register himself in order to receive a non-chargeable experience service (step a1).

FIG. 9 shows user information of one user in a user database (which may be abbreviated as user DB) recording the information of the users who subscribed for this internet distribution service system structured in the server machine.

This figure shows a record of the user's telephone number, name, zip code, address, age, and sex. The user information shown in FIG. 9, however, relates a user who wished to utilize the non-chargeable experience service, so that by this embodiment, during the non-chargeable experience service, the user ID is not issued ("ID=0" indicates that the user ID is not issued yet) and the point value SP given to a user of a regular internet distribution service ("SP=0" indicates that the point value SP is 0).

Although in this embodiment a user ID is not issued to a user who is utilizing the non-chargeable experience service but, as described later, the user is identified by his telephone number and name, the invention is not limited thereto; for example, a tentative user ID may be issued to a user when he started to utilize the non-chargeable experience service so that during this service he may be identified by this tentative user ID.

Now back to FIG. 8 for further explanation.

Although the next steps b3 and b4 in FIG. 8 are not of the client program but of a part of the server program (see steps b3 and b4 of FIG. 12), they are shown in FIG. 8 for convenience in explanation of the process.

The client has transmitted his individual identification information to the server to register himself in order to receive the non-chargeable experience service, the server searches the user database (DB) for his registration in the user DB (see FIG. 9) to decide, based on the retrieval result, whether the user has once utilized an internet distribution service provided by this server (step b3).

If the user has not utilized the service yet, the server allocates a storage space for storing P (point) and T (time) for the user's non-chargeable experience service to there by write in the initial vales of P and T (here, P=0 and T=6 hours) and also transmit these initial values to the client. The client receives the P and T initial values (step a2) and, as shown in FIG. 6, displays the P and T values on the screen (step a5).

FIG. 10 shows a list of P (point) and T (remaining time) of each users utilizing the non-chargeable experience service recorded in the user DB at the server.

In this embodiment, each user is identified by his telephone number and name and has his P (point) and T (time) recorded corresponding to himself. When the user has registered himself for utilizing the non-chargeable experience service he wishes (see step a1 in FIG. 8), he has his own one user information field shown in FIG. 9 and one P-and-T field allocated in the user DB at the server; specifically, the user information field shown in FIG. 9 records individual information with ID and SP both set at 0, while the P-and-T field shown in FIG. 10 records a telephone number and a name to identify the user with the initial values set at P=0 (points) and T=6 (hours).

Now back to FIG. 8 again for further explanation.

If the user is decided to have been registered in the user DB at step b3 in FIG. 8, in the server, it is decided whether the user has been assigned a regular user ID (step b4) and, if he has been assigned it, he is recognized to be a regular member, and then the process goes to a step of handling him as the regular member (step a12).

FIG. 11 shows the regular member user information in the user DB at the server.

As compared to the user information of the users utilizing the non-chargeable experience services in FIG. 9, the regular member user information records the regular user ID ("ID=XXXXXXX" indicates a regular user ID) and a regular member point value Now back to FIG. 8 again for further explanation.

If the user is decided not to be a regular member yet at step b4, on the other hand, the server obtains (see FIG. 10) the information of the user's P (point) and T (remaining time) using his telephone number and name as a key to then transmit the user's P and T values to the user (client). The client in turn receives these P and T values (step a3).

In this step, as described later, in the server, the point value of each user utilizing the non-chargeable experience service is updated to be sequentially incremented corresponding to his time lapse of utilizing the non-chargeable experience services and also his remaining time of utilizing the non-chargeable experience services is sequentially decremented, thus sequentially updating each user's P and T values as shown in FIG. 11.

Upon reception of the P and T values, the client decides whether T>0, that is, whether there is still a time available for utilizing the non-chargeable experience service (step a4).

If T>0, the process goes to step a5, thus displaying the P and T values as shown in FIG. 7, for example.

When the user clicks the mouse on the "ENTRY BUTTON" on the screen (step a8), the process displays a form of registering a regular member to permit the user to write in information necessary for his registration as a regular member (step a10) and then receives a user ID as a registered regular member (step a11) so that he may be treated as a regular member from that moment on (step a12).

If the process decides that the "ENTRY BUTTON" is not yet pressed at step a8, on the other hand, the process goes to step a9 to decide whether the line with the user and the server is still connected and, if so, returns to step a3 to receive new P and T values from the server to repeat steps a3-a9.

If the process decides that T>0 is not true, that is, the non-chargeable experience service time has expired at step a4, the process notifies the user of this expiration and displays a screen for asking him whether he would take steps necessary to become a regular member. If the user expresses his will to become a regular member (step a6), the process displays a regular member registration form (step a10) to permit him to write in necessary items in the form to transmit it to the server, thus registering himself as a regular member (step a11).

If the user expresses his will not to become a regular member at step a6, the process goes to step a7 to execute processing necessary to prevent the client program shown in FIG. 8 from being reactivated in order to inhibit the subsequent utilization of the non-chargeable experience service and then ends this routine.

Figure 12:
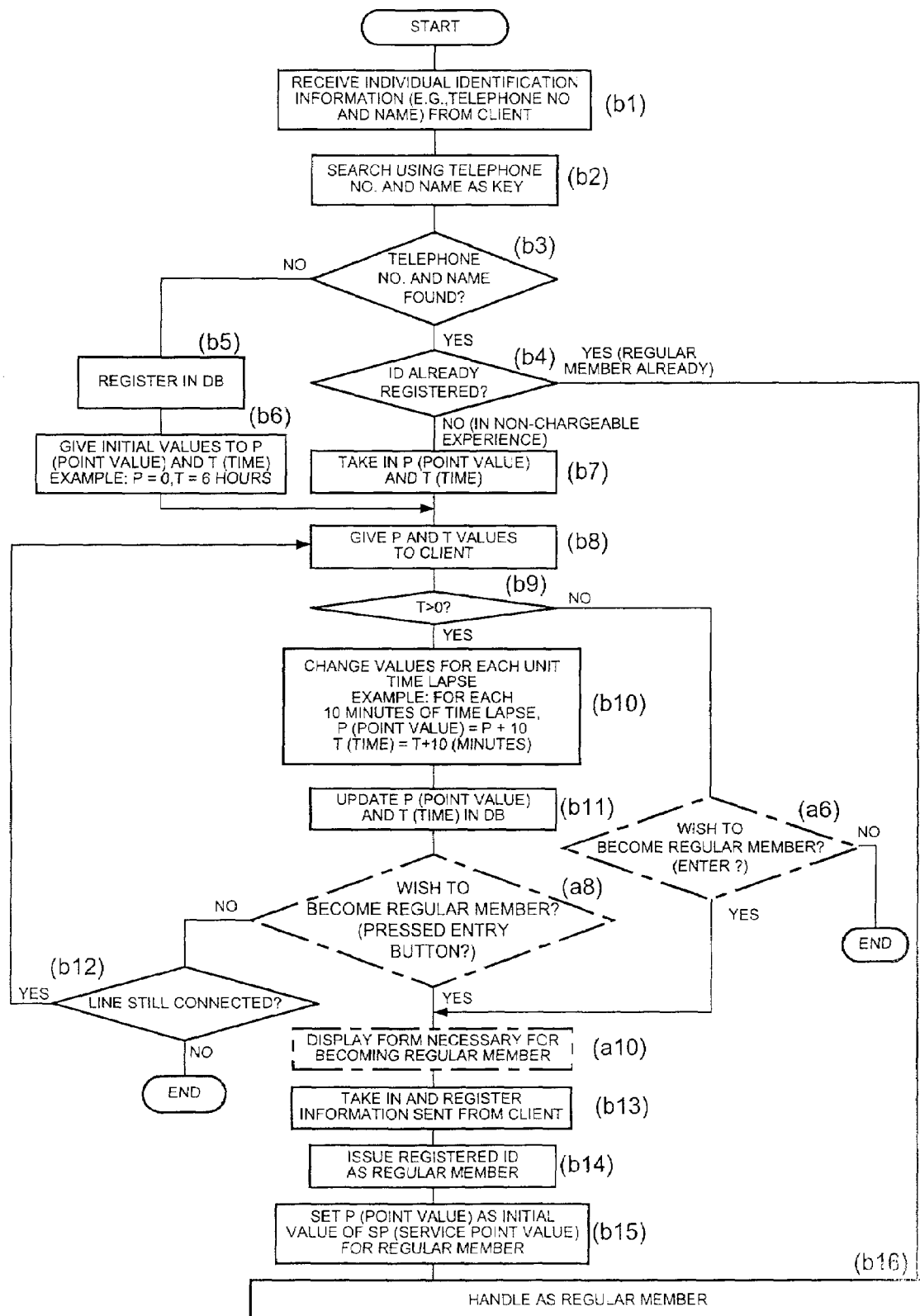
FIG. 12 is a flowchart for showing operations of the server program executed by the server machine.

FIG. 12 shows a flowchart of the server program executed at the server machine. To facilitating explanation, this flowchart contains some steps of the client program.

First, the process receives from a client his individual identification information including his telephone number and name (step b1) and searches the user DB using the telephone number and name (step b2) to decide whether there is present user information recording these telephone number and name used as the key (step b3). If there is no user information registered which records the same telephone number and name, the individual identification information received at step b1 is registered in the user DB (see FIG. 9) (step b5), so that these newly registered user's P (point) and T (time) values are assigned initial values (in this case, P=0 and T=6 hours) respectively (see FIG. 11) (step b6).

If the process decides, at step b3, that there is present user information recording the same telephone number and name as those recorded in the individual identification information received at step b1, on the other hand, the process goes to step b4 to decide whether the user information registers therein a regular user ID (see FIG. 12) or not (see FIG. 9). If a regular user ID is registered in the user information already, the user is recognized to be a regular member and handled so from that moment on (step b16).

If the process decides that the user's user information is present but this user information does not have a regular user ID registered therein at step b4 (see FIG. 9), the user must be still utilizing a non-chargeable experience service, so that the process goes to step b7 to fetch the user's current P (point) and T (time) values from the user DB (see FIG. 10).

The P and T values fetched from the user DB at step b7 or those given as initial values at step b6 are given to the user (client) (step b8). At step b9, the process decides whether the remaining time of the user (client) T>0 or not. This decision is made also on the side of the client, so that if the process decides that T>0 is not true, the client side is asked to wish to become a regular member (step a6).

If the server side decides that T>0, the P and T values are updated for each time lapse (step b10). In this case, for each 10 minutes, for example, the P (point) value is incremented by 10 and the T (time) value is decremented by 10 minutes. Based on thus calculated P and T values, the P and T values in the user DB are updated (see FIG. 10) (step b11).

If the user is yet to express his will to become a regular member (step a8) and the line with the client is still connected (step b12), the process returns to step b8 to give the P and T values after being updated at step b11 to the client, thus subsequently repeating processing of steps b8-b12.

When the line with the client is disconnected (step b12), the process once ends this routine. To resume the non-chargeable experience service for that client, the process restarts this routine from its beginning.

If, the client expresses his will to enter the system as a regular member (steps a6, a8), the client is given a regular member registration form displayed for him (step a10) to then write in necessary item in the form and transmit it to the server, which in turn fetches the information from the client to register it (step b13) to then issue thus registered user ID to the client (see FIG. 11) (step b14), so that a point value P (see FIG. 10) the client acquired for a time lapse of utilizing non-chargeable experiment services is set as an initial value of the regular member's SP (service point) value (step b15). From this moment on, the client is handled as a regular member (step b16).

By this embodiment, as shown at step b10 in FIG. 12, the more the client utilizes non-chargeable experiment services, the more is incremented his point value (P), thus motivating him to utilize the non-chargeable experiment services rather than becoming a regular member too early and also motivating him to be registered as a regular member without wasting his acquired point value.

Figure 13:
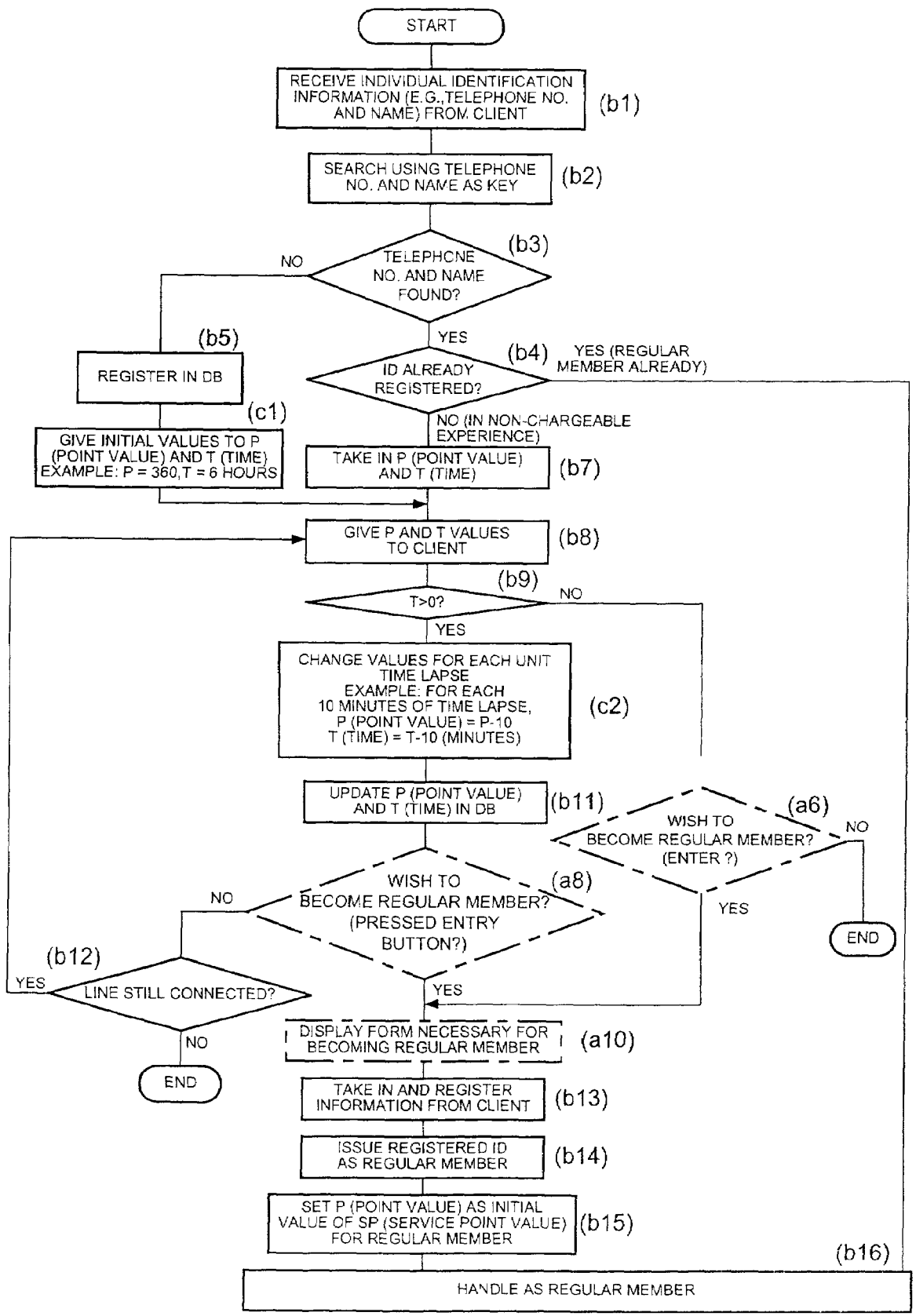
FIG. 13 is a flowchart for showing operations of another example of the server program executed by the server machine.

FIG. 13 shows a flowchart of another example of the server program executed at the server machine. Like the flowchart of FIG. 12, this flowchart also contains some steps executed on the side of the client for facilitating the processing.

In contrast to the earlier mentioned example of incrementing the point value as the utilization time lapse elapses, this example decrements the point value as the utilization time lapse elapses.

Such a client program as shown in FIG. 8 is used as is as the client program used in pair with this server program of FIG. 13.

The following will describe only the difference from the server program of FIG. 12.

The difference of the server program of FIG. 13 from that of FIG. 12 lies in only steps c1 and c2 that correspond to steps b6 and b10 of the server program of FIG. 12 respectively.

At step c1, a client starting to newly utilize a non-chargeable experience service is assigned the initial P (point) and T (time) values of, for example, P=360 and T=6 (hours), while at step c2, the point value P is decremented by 10 and the time value T is decremented by 10 minutes each time the client utilizes the non-chargeable experiment service for 10 minutes. That is, the server program of FIG. 13 behaves the same way on the time value T as that of FIG. 12 but, on the point value P, sets a high point value (P=360) as the initial value so that it may be decremented each time the client utilizes the non-chargeable experiment service.

In this example of the server program shown in FIG. 13 also, the point value is displayed as time passes by to thereby call the user's attention and, also, prompts him to enter the system as a regular member early because his point value decreases as time passes by.

Thus, no matter whether increasingly or decreasingly, the point value can be changed sequentially as time passes by to thereby motivate the user to utilize a regular service and, by displaying it, call his attention further.

In both combinations of FIGS. 8 and 12 and FIGS. 8 and 13, both the P (point) and T (time) values are updated on the side of the server, although they may be updated on the side of the client. An example thereof is described below.

Figure 14:
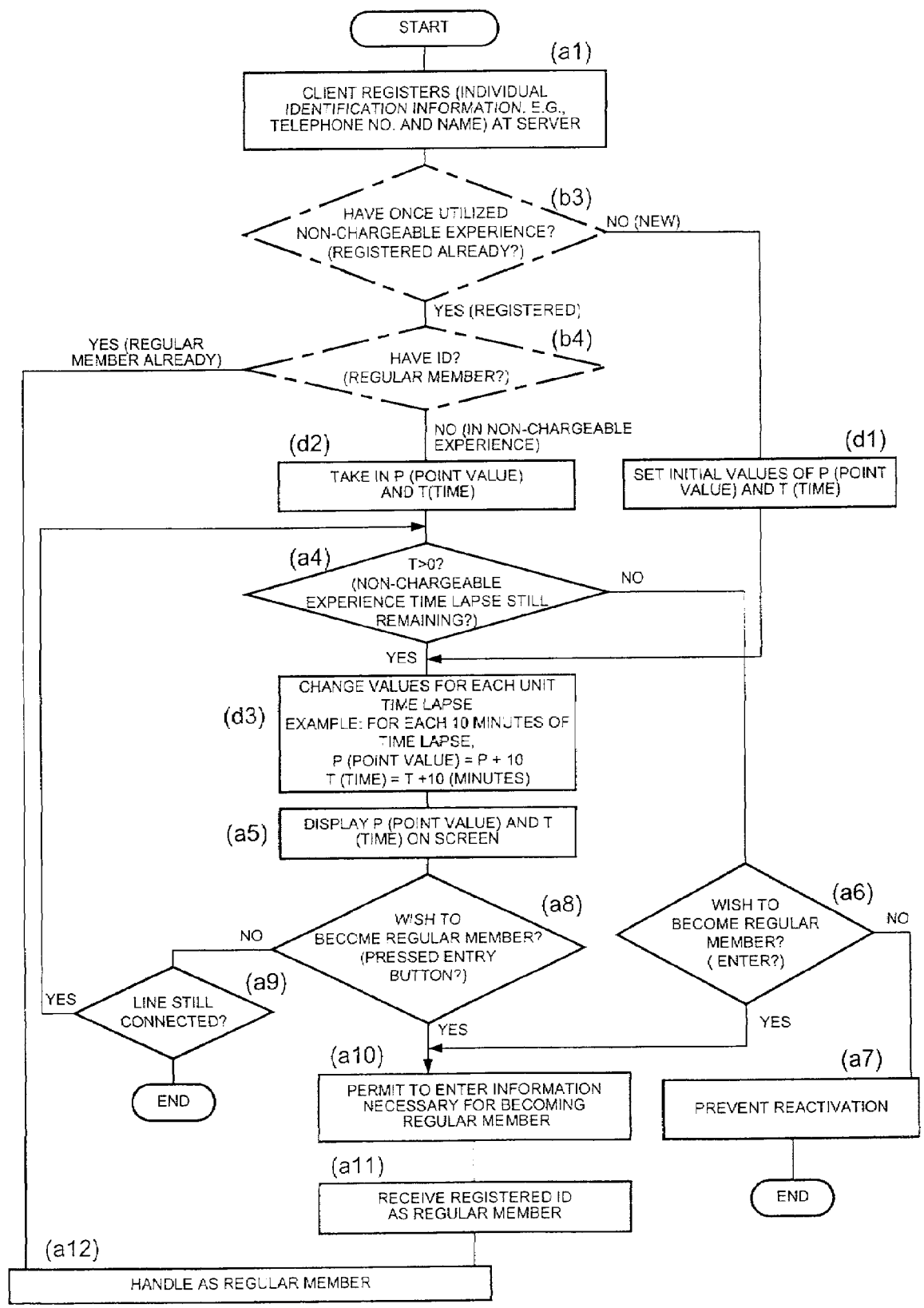
FIG. 14 is a flowchart for showing operations of another example of the client program and the server program.
Figure 15:
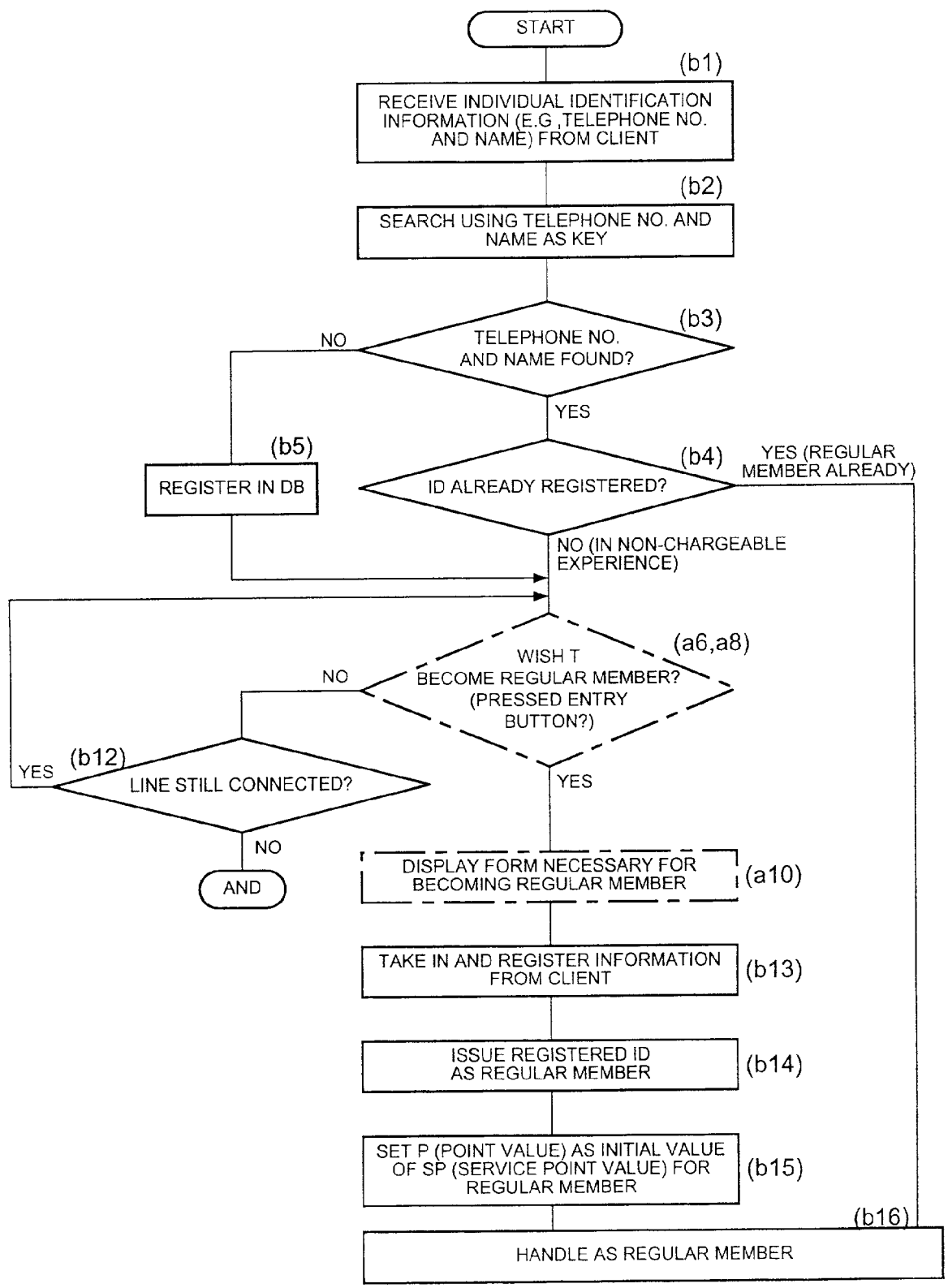
FIG. 15 is a flowchart for showing further example of the client program and the server program.

FIGS. 14 and 15 show flowcharts of other examples of the client program and the server program respectively.

In contrast to the client program of FIG. 8 in which P and T values are received from the server side at steps a2 and a3, in the client program of FIG. 14 the client itself sets the initial values of P and T at step d1 in place of step a2 of FIG. 8 and, at step d2 in place of step a3 of FIG. 8, the P and T values updated by the client itself are taken in.

Further, the client program of FIG. 14 has step d3 interposed between steps a4 and a5, at which step d3 the P and T values are changed for each unit time lapse. In this example, like at step b10 of FIG. 12, the point value P is incremented by 10 and the time value T is decremented for each 10 minutes.

In contrast to the server program of FIG. 12, the server program of FIG. 15 has deleted such steps (steps b6, b7, b8, b9, b10, and b11 of FIG. 12) that were rendered unnecessary because the P and T values were to be updated on the side of the client. The other steps shown in FIG. 15 are explained already with reference to FIG. 12 and so their duplicate explanation is omitted here.

Thus, the point value during a non-chargeable experiment service period or the remaining time of utilizing this service may be calculated and managed on the side of the server or the client whichever appropriate.

Although in the above-mentioned embodiments, the client side is adapted to display a current point value to thereby motivate the user to subscribe for a regular service system or to do so early, this configuration is not indispensable. For example, any means may be used to notify the user of a fact that his point value assigned upon his entry to the regular service system will be increased or decreased corresponding to his time lapse of utilizing a tentative service. In this case, the user needs only to be informed of his time lapse of tentative service utilization on display to know about his remaining time lapse available for utilizing tentative services and also to be reminded of a mechanism of adding the point value.

Further, although the above embodiments all have exemplified provision of regular and tentative services by the same server machine, these two kinds of services may be provided by different server machines respectively. In this case, these different server machines can be linked with each other so that the server machine of them that provides a regular service may be notified of a point value calculated in a tentative service when the user enters the regular service system. Also, of course, the server machine that provides a regular service or a tentative service may be given more than one in configuration.

Although the above embodiments have exemplified the internet distribution service, the invention is not limited thereto; for example, it is applicable to a variety of other service systems. They are described below.

(1) In a service of distributing over the internet such data necessary for a client to purchase and install in his computer so-called vaccine software which detects a virus in computer software to then kill it to thereby kill all the viruses appearing one after another, the data is distributed at no charge for a predetermined time lapse and, when it expires, distributed only to the regular members, so that almost the same mechanism as that of the above-mentioned internet distribution service may be employed to give a point value time-wise changing during a non-chargeable time period to the client when he became a regular member, thus benefiting him someway.

(2) In the case of game software executed over the internet, likewise, a non-chargeable experiment service and a subsequent chargeable regular service are provided to sequentially update the point value as the non-chargeable experiment service utilizing time passes by, thus someway benefiting the client corresponding to a point value when he became a regular member.

(3) The same mechanism can be adapted also to an educational system executed over the internet.

(4) In the case of a service system for distributing shareware to thereby first make it available for a predetermined time period in an non-chargeable manner and later in a chargeable manner, during that non-chargeable time period, a point value sequentially decreasing time-wise is given so that upon purchase the sales price may be discounted corresponding to the point value, thus prompting the user to purchase the shareware software early.

These are given just as examples and, of course, the invention is applicable in a variety of systems for providing services over a communication line such as the internet.

Thus, the invention prompts the user to utilize the regular service.

What is claimed is:

1. A client machine which is connected through a communication line with a service providing server machine to subscribe for a service system provided by said server machine in order to be provided with a service independently from one or more other client machines according to said service system, said server machine provides a regular service and also a tentative service prior to the provision of said regular service, said client machine comprising:

a tentative service utilization section for utilizing a tentative service provided by said server machine independently from one or more other client machines;

a point value display section for displaying a point value sequentially changing independently from one or more other client machines when said tentative service utilization section is utilizing a tentative service, the point value becoming a time available in the regular service if the client machine registers to the regular service within a lapse of a predetermined time from a beginning of utilization of the tentative service; and a regular service utilization procedure section for taking procedure steps for utilizing the regular service provided by said server machine independently from one or more other client machines said client sequentially updates the point value as time passes by when utilizing the tentative service provided by said tentative service providing section; said regular service utilization procedure accepting section accepts a procedure for utilizing the regular service that is made by the client machine provided with the tentative service by said tentative service providing section and also accepts the point value updated by said client machine at a moment when said procedure was accepted; and said regular service providing section provides the service corresponding to the point value accepted by said regular service utilization procedure accepting section to the client machine whose procedure was accepted by said regular service utilization procedure accepting section.

2. The client machine according to claim 1, wherein said point value display section displays a point value sequentially increasing as time passes by when said tentative service utilization section is utilizing said tentative service.

3. The client machine according to claim 1, wherein said point value display section displays a point value sequentially decreasing as time passes by when said tentative service utilization section is utilizing said tentative service.

4. The client machine according to claim 1, further comprising a point value updating section for sequentially updating a point value displayed at said point value display section when said tentative service utilization section is utilizing said tentative service.

5. The client machine according to claim 1, wherein said point value display section receives and displays a sequentially updated point value transmitted from said server machine when said tentative service utilization section is utilizing said tentative service.

6. The client machine according to claim 1, comprising a regular service utilization section for continuing utilization of a regular service provided by said server machine after procedure steps are taken at said regular service utilization procedure section.

7. The client machine according to claim 1, wherein said tentative service is a non-chargeable tentative service and said regular service is a chargeable regular service.

8. A server machine connected through a communication line with a client machine which is provided with a service independently from one or more other client machines by said server machine after said client machine subscribed for a service system provided by said server machine, said server machine providing a regular service and also a tentative service prior to the provision of said regular service, comprising:
  a tentative service providing section for providing the tentative service to the client machine prior to the provision of the regular service independently from one or more other client machines;
  a regular service utilization procedure accepting section for accepting a procedure for utilization of the regular service that is made by the client machine provided with the tentative service by said tentative service providing section; and
  a regular service providing section for providing the regular service independently from one or more other client machines to the client machine said procedure of which was accepted, wherein:
  said regular service providing section provides a service independently from one or more other client machines corresponding to a point value acquired during the tentative service provided by said tentative service providing section until the client machine was accepted by said regular service utilization procedure accepting section;
  said point value sequentially changes as time passes by when said tentative service providing section is providing said client machine with the tentative service,
  said client machine is adapted to sequentially update the point value as time passes by when utilizing the tentative service provided by said tentative service providing section;
  said regular service utilization procedure accepting section accepts a procedure for utilizing the regular service that is made by the client machine provided with the tentative service by said tentative service providing section and also accepts the point value undated by said client machine at a moment when said procedure was accepted: and
  said regular service providing section provides the service corresponding to the point value accepted by said regular service utilization procedure accepting section to the client machine whose procedure was accepted by said regular service utilization procedure accepting section.

9. The server machine according to claim 8, wherein said regular service providing section continuously provides the regular service to the client machine whose procedure was accepted by said regular service utilization procedure accepting section.

10. The server machine according to claim 9, wherein said regular service providing section continuously provides the regular service to the client machine whose procedure was accepted by said regular service utilization procedure accepting section and give a point value for providing an additive service corresponding to an utilization situation of the regular service and also give as an initial value the point value that corresponds to the tentative service provided by said tentative service providing section for a time lapse up to a moment when the procedure made by the client machine was accepted by said regular service utilization procedure accepting section.

11. The server machine according to claim 8, comprising a point value updating section for sequentially updating the point value for the client machine as time passes by when said tentative service providing section is providing said client machine with the tentative service, wherein
  said regular service providing section provides the service corresponding to the point value for said client machine that is updated by said point value updating section at a moment when said procedure was accepted.

12. The server machine according to claim 8, wherein said point value updating section is adapted to sequentially increase the point value for the client machine as time passes by when said tentative service providing section is providing said client machine with the tentative service.

13. The server machine according to claim 8, wherein said point value updating section sequentially decreases the point value for the client machine as time passes by when said tentative service providing section is providing said client machine with the tentative service.

14. A client program storage medium recording a client program which, when executed in a computer connected through a communication line with a server machine providing a service independently from one or more other client machines, permits said computer to subscribe for a service system provided by said server machine so as to operate as a client machine which is provided with the service according to said service system, said server machine provides a regular service and also a tentative service prior to the provision of the regular service, wherein said computer is specifically permitted to operate as the client machine comprising:
  a tentative service utilization section for utilizing the tentative service provided by said server machine independently from one or more other client machines;
  a point value display section for displaying a point value sequentially changing independently from one or more other client machines when said tentative service utilization section is utilizing the tentative service, the point value becoming a time available in a regular service when the computer registers for the regular service within a lapse of a predetermined time from a beginning of utilization of the tentative service; and
  a regular service utilization procedure section for taking a procedure for utilizing the regular service provided by said server machine independently from one or more other client machines said client sequentially updates the point value as time passes by when utilizing the tentative service provided by said tentative service providing section; said regular service utilization procedure accepting section accepts a procedure for utilizing the regular service that is made by the client machine provided with the tentative service by said tentative service providing section and also accepts the point value updated by said client machine at a moment when said procedure was accepted; and said regular service providing section provides the service corresponding to the point value accepted by said regular service utilization procedure accepting section to the client machine whose procedure was accepted by said regular service utilization procedure accepting section.

15. The client program storage medium according to claim 14, wherein said point value display section displays the point value sequentially increasing as time passes by when said tentative service utilization section is utilizing the tentative service.

16. The client program storage medium according to claim 14, wherein said point value display section displays the point value sequentially decreasing as time passes by when said tentative service utilization section is utilizing the tentative service.

17. The client program storage medium according to claim 14, said client program permits said computer to operate as the client machine further comprising a point value updating section for sequentially updating a point value displayed at said point value display section when said tentative service utilization section is utilizing the tentative service.

18. The client program storage medium according to claim 14, wherein said point value display section receives and displays a sequentially updated point value transmitted from said server machine when said tentative service utilization section is utilizing the tentative service.

19. The client program storage medium according to claim 14, said client program permits said computer to operate as the client machine further comprising a regular service utilization section for continuing the utilization of the regular service provided by said server machine after said regular service utilization procedure section accepted the procedure.

20. A server program storage medium recording a server program which, when executed in a computer connected through a communication line with a client machine provided with a service independently from one or more other client machines, permits said computer to provide the service to the client machine after said client machine subscribed for a service system provided thereby, said server program provides a regular service and also a tentative service prior to the provision of the regular service, wherein said computer is specifically permitted to operate as the server machine, comprising:
 a tentative service providing section for providing the tentative service to said client machine prior to the provision of the regular service independently from one or more other client machines;
 a regular service utilization procedure accepting section for accepting such a procedure for utilizing the regular service that is made by said client machine provided with the tentative service by said tentative service providing section; and
 a regular service providing section for providing the regular service independently from one or more other client machines to the client machine whose procedure was accepted by said regular service utilization procedure accepting section, wherein:
 said regular service providing section provides the service independently from one or more other client machines according to a point value acquired during the tentative service provided by said tentative service providing section until said client machine was accepted by said regular service utilization accepting section;
 said point value sequentially changes as time passes by when said tentative service providing section is providing the tentative services;
 said client machine sequentially updates the point value as time passes by when utilizing the tentative service provided by said tentative service providing section;
 said regular service utilization procedure accepting section accepts a procedure for utilizing the regular service that is made by the client machine provided with the tentative service by said tentative service providing section and also accepts the point value updated by said client machine at a moment when said procedure was accepted: and
 said regular service providing section provides the service corresponding to the point value accepted by said regular service utilization procedure accepting section to the client machine whose procedure was accepted by said regular service utilization procedure accepting section.

21. The server program storage medium according to claim 20, wherein said regular service providing section is adapted to continuously provide the regular service to the client machine whose procedure was accepted by said regular service utilization procedure accepting section.

22. The server program storage medium according to claim 21, wherein said service providing section continuously provides the regular service to the client machine whose procedure was accepted by said regular service utilization procedure accepting section and give a point value for providing an additive service corresponding to a utilization situation of the regular service and also give as an initial value the point value that corresponds to the tentative service provided by said tentative service providing section for a time lapse up to a moment when the procedure made by the client machine was accepted by said regular service utilization procedure accepting section.

23. The server program storage medium according to claim 20, comprising a point value updating section for sequentially updating the point value for the client machine as time passes by when said tentative service providing section is providing said client machine with the tentative service, wherein
 said regular service providing section provides the service corresponding to the point value for said client machine that is updated by said point value updating section at a moment when said procedure was accepted.

24. The server program storage medium according to claim 20, wherein said point value updating section is adapted to sequentially increase the point value for the client machine as time passes by when said tentative service providing section is providing said client machine with the tentative service.

25. The server program storage medium according to claim 20, wherein said point value updating section sequentially decreases the point value for the client machine as time passes by when said tentative service providing section is providing said client machine with the tentative service.

26. A service providing method for permitting a server machine to provide services to a user machine, said services including a regular service provided independently from one or more other user machines to the user machine utilized by a subscribed user and a tentative service provided to the user machine utilized by a non-subscribed user prior to the provision of the regular service, said method comprising:
 providing the tentative service to the user machine prior to the provision of the regular service;
 storing a tentative service utilization time lapse of said user machine;
 accepting a procedure for utilizing the regular service that is made by the user machine provided with the tentative service within a lapse of time from a beginning of utilization of the tentative service;

calculating a point value independently from one or more other user machines corresponding to said tentative service utilization time lapse up to a moment when said regular service utilization procedure was accepted; and providing the regular service to the user machine whose regular service utilization procedure was accepted and also providing the regular service free corresponding to said calculated point value to the user whose utilization procedure was accepted, wherein:

said point value sequentially changes while the tentative service is provided to the user machines;

said accepting includes also accepting the point value sequentially changed when said procedure was accepted; and said providing includes providing the service corresponding to the accepted point value.

27. The service providing method according to claim 26, wherein information about said tentative service utilization time lapse is displayed at said user machine.

28. The service providing method according to claim 27, wherein said calculated point value is displayed at the user machine provided with the tentative service when said user machine is being provided with the tentative service.

29. The service providing method according to claim 26, wherein said point value is increased as said tentative service utilization time lapse increases.

30. The service providing method according to claim 26, wherein said point value is decreased as said tentative service utilization time lapse increases.

31. A service system comprising:
a server machine which is connected with service receiving client machines to thereby provide a service independently to at least one client machine after said at least one client machine subscribed for said service system, wherein said server machine provides a regular service and also a tentative service prior to the provision of the regular service, the server machine comprising:
 a tentative service providing section for providing the tentative service to the at least one client machine prior to the provision of the regular service;
 a regular service utilization procedure accepting section for accepting a procedure for utilization of the regular service that is made by the at least one client machine provided with the tentative service by said tentative service providing section; and
 a regular service providing section for providing the regular service to the at least one client machine said procedure of which was accepted, said regular service providing section provides free regular service corresponding to a point value acquired during the tentative service provided by said tentative service providing section for a time lapse up to a moment when the procedure made by the at least one client machine was accepted by said regular service utilization procedure accepting section; and said at least one client machine comprises:
 a tentative service utilization section for utilizing the tentative service provided by said server machine independently from one or more other client machines;
 a point value display section for displaying a point value sequentially changing independently from one or more other client machines as a time lapse available in the regular service passes by when said tentative service utilization section is utilizing the tentative service within a lapse of a predetermined time from a beginning of utilization of the tentative service; and
 a regular service utilization procedure section for taking procedure steps for utilizing the regular service provided by said server machine independently from one or more other client machines wherein:

said at least one client machine sequentially updates the point value as time passes by when utilizing the tentative service provided by said tentative service utilization section;

said regular service utilization procedure accepting section accepts a procedure for utilizing the regular service that is made by the client machine provided with the tentative service by said tentative service providing section and also accepts the point value undated by said client machine at a moment when said procedure was accepted; and said regular service providing section provides the service corresponding to the point value accepted by said regular service utilization procedure accepting section to the client machine whose procedure was accepted by said regular service utilization procedure accepting section.

32. The service system according to claim 31, wherein said point value display section displays the point value sequentially increasing as time passes by when said tentative service utilization section is utilizing the tentative service.

33. The service system according to claim 31, wherein said point value display section displays the point value sequentially decreasing as time passes by when said tentative service utilization section is utilizing the tentative service.

34. The service system according to claim 31, wherein said client machine comprises a point value updating section for sequentially updating the point value displayed at said point value display section when said tentative service utilization section is utilizing the tentative service.

* * * * *

UNITED STATES PATENT AND TRADEMARK OFFICE
CERTIFICATE OF CORRECTION

PATENT NO. : 7,340,524 B2  
APPLICATION NO. : 10/057886  
DATED : March 4, 2008  
INVENTOR(S) : Shigeru Hidesawa It is certified that error appears in the above-identified patent and that said Letters Patent is hereby corrected as shown below:

Column 19, line 50, delete "undated" and insert --updated--.

Column 21, line 67, delete "services" and insert --service--.

Column 22, line 10, delete "accepted:" and insert --accepted;--.

Column 23, line 13, delete "machines" and insert --machine--.

Column 24, line 30, delete "undated" and insert --updated--.

Signed and Sealed this

Eighth Day of July, 2008

JON W. DUDAS  
*Director of the United States Patent and Trademark Office*